(12) United States Patent
Oosako

(10) Patent No.: US 8,290,601 B2
(45) Date of Patent: Oct. 16, 2012

(54) PLANT CONTROL SYSTEM

(75) Inventor: Satoru Oosako, Musashino (JP)

(73) Assignee: Yokogawa Electric Corporation, Tokyo (JP)

( * ) Notice: Subject to any disclaimer, the term of this patent is extended or adjusted under 35 U.S.C. 154(b) by 1011 days.

(21) Appl. No.: 12/085,460

(22) PCT Filed: Nov. 21, 2006

(86) PCT No.: PCT/JP2006/323242
§ 371 (c)(1),
(2), (4) Date: May 22, 2008

(87) PCT Pub. No.: WO2007/060959
PCT Pub. Date: May 31, 2007

(65) Prior Publication Data
US 2009/0171479 A1    Jul. 2, 2009

(30) Foreign Application Priority Data
Nov. 25, 2005   (JP) ................ 2005-339836

(51) Int. Cl.
G05B 9/02 (2006.01)
G05B 23/02 (2006.01)
G05B 19/00 (2006.01)
H04Q 5/22 (2006.01)
G06F 19/00 (2006.01)
G06F 7/04 (2006.01)

(52) U.S. Cl. ......... 700/79; 340/3.1; 340/5.54; 340/5.85; 340/10.52; 340/5.2; 700/169; 726/26; 726/27; 726/4

(58) Field of Classification Search ............. 340/825.34, 340/3.1, 5.54, 5.85, 10.52, 5.2; 395/188.01, 395/186, 187.01, 600, 700, 726, 427, 490, 395/491; 713/200, 201, 202, 183, 184; 726/2, 726/3, 5, 4, 26, 27; 700/79, 169
See application file for complete search history.

(56) References Cited

U.S. PATENT DOCUMENTS

| | | | | |
|---|---|---|---|---|
| 5,018,096 A | * | 5/1991 | Aoyama | 711/164 |
| 5,283,782 A | * | 2/1994 | Takase et al. | 370/219 |
| 5,805,674 A | * | 9/1998 | Anderson, Jr. | 379/93.03 |
| 5,944,825 A | * | 8/1999 | Bellemore et al. | 726/18 |
| 2006/0253598 A1 | * | 11/2006 | Nakamura et al. | 709/230 |

FOREIGN PATENT DOCUMENTS

CN        1354933 A        6/2002

(Continued)

OTHER PUBLICATIONS

PCT/IB/308, PCT/IB/326, PCT/IB/338, PCT/IB/373 & PCT/ISA/237 (with English translation).

(Continued)

Primary Examiner — Brian Zimmerman
Assistant Examiner — Mirza Alam
(74) Attorney, Agent, or Firm — Westerman, Hattori, Daniels & Adrian, LLP

(57) ABSTRACT

A plant control system includes at least one control apparatus, and an engineering apparatus for changing a security state of the control apparatus. The control apparatus includes: a security management part for accepting a security level change request downloaded from the engineering apparatus and changing a security level of the control apparatus by referring to a password held by the control apparatus; and a change permission part for permitting a change in the security level by the security management part.

6 Claims, 4 Drawing Sheets

FOREIGN PATENT DOCUMENTS

| | | |
|---|---|---|
| JP | 4-294401 | 10/1992 |
| JP | 2001-175301 | 6/2001 |
| JP | 2005-222464 | 8/2005 |
| JP | 2005-301935 | 10/2005 |
| WO | 00/76117 A1 | 12/2000 |

OTHER PUBLICATIONS

Chinese Office Action dated Nov. 13, 2009, issued in corresponding Chinese Patent Application No. 2006800438999.

International Search Report (with English translation).

* cited by examiner

PLANT CONTROL SYSTEM

TECHNICAL FIELD

The present invention relates to a plant control system including an engineering apparatus for changing a security state of a control apparatus, and the control apparatus having a security management part for accepting a security level change request downloaded from the engineering apparatus and changing a security level by referring to a held password.

BACKGROUND ART

A plant control system is known which includes a safety control apparatus for performing a stop operation of a plant in response to an abnormal signal from the plant at the time of occurrence of abnormality for safe operation of the plant.

FIG. 5 is a functional block diagram showing one example of a plant control system in which a safety control apparatus is combined with a distributed control apparatus. Reference numeral 1 is a plant as a controlled object, and reference numeral 2 is a control apparatus of the distributed control apparatus and performs control of a field device of the plant 1.

The control apparatus 2 communicates with a host operation monitoring apparatus 4 through a control bus 3. The operation monitoring apparatus 4 is connected to a global communication bus 5 and can communicate with an external PC 6 through this global communication bus 5.

Reference numeral 10 is an engineering apparatus for changing definition information (security level) about a system, and is connected to the control bus 3. This engineering apparatus 10 is also connected to the global communication bus 5 and can communicate with the operation monitoring apparatus 4 and the external PC 6.

Reference numeral 20 is a safety control apparatus connected to the control bus 3. This safety control apparatus 20 communicates with the engineering apparatus 10 through the control bus 3 and also communicates with the field device of the plant 1 and performs shutdown processing for performing a stop operation of the plant in response to an abnormal signal from the plant 1.

In the safety control apparatus 20, reference numeral 21 is a communication interface part, and a data change request and a security change request downloaded from the engineering apparatus 10 are accepted and the security change request is passed to a security management part 22 and also the data change request is passed to a request acceptance task 23.

Reference numeral 24 is a security level holding part, and holds the present security state (security level) of the safety control apparatus 20. The contents in which a database or a program described below can be rewritten depend on the security level.

Only the security management part 22 has the authority to change a security state held by the security level holding part 24. The security management part 22 refers to the contents of a password holding part 25 in the case of acquiring a security change request from the engineering apparatus 10 and changing the security state of the security level holding part 24.

The request acceptance task 23 is constructed of a group of tasks of accepting various change requests with respect to the safety control apparatus 20, and refers to the present security information held by the security level holding part 24 in the case of performing acceptance processing.

Each of the request acceptance tasks 23 decides whether or not to pass a change request to a request processing task 26 based on the security information referred. The request processing task 26 refers to or sets a program 27 or a database 28 based on the change request passed from the request acceptance task 23.

A user first performs a security change operation from the engineering apparatus 10 in the case of changing data of the database 28 or the contents of the program 27 of the safety control apparatus 20. At this time, in order to change a security state of the safety control apparatus 20 from the engineering apparatus 10, a password corresponding to its security state is required.

The safety control apparatus 20 can change the security state only when a proper password is set from the engineering apparatus 10. That is, the safety control apparatus 20 construes knowledge of the password as a special user having the change authority.

A process control apparatus comprising a security management function is described in Patent Reference 1.

See Patent Reference 1: JP-A-2005-301935

DISCLOSURE OF THE INVENTION

Problems that the Invention is to Solve

In the plant control system in a related art, only a password inputted to the engineering apparatus 10 is required at the time of changing a security level of the safety control apparatus 20. As compared with a switching mechanism by a hardware switch, the system does not fail and an operation from remote sites can also be performed and it is easy for a user to handle the system.

On the other hand, as long as a password is known, any user can perform a change operation and there is a possibility that a security level is easily decreased from a malignant person and a program or a database might be destroyed.

The present invention has been made in order to solve the above-described problem, and provides a plant control system for protecting a security level so that the security level cannot be changed at unintended timing.

Means for Solving the Problems

A plant control system includes at least one control apparatus, and an engineering apparatus for changing a security state of the control apparatus. The control apparatus includes: a security management part for accepting a security level change request downloaded from the engineering apparatus and changing a security level of the control apparatus by referring to a password held by the control apparatus; and a change permission part for permitting a change in the security level by the security management part.

In the plant control system, the control apparatus further includes a user application to which a permission signal given from the outside of the control apparatus is inputted, and the change permission part is operated by an output from the user application.

In the plant control system, the user application includes a function block to which the permission signal is inputted and which outputs a signal for operating the change permission part.

In the plant control system, the permission signal is inputted to the function block by a switch part operated by a system administrator.

In the plant control system, the permission signal given from an external device through communication is inputted to the function block.

In the plant control system, the permission signal given from an external device through communication is inputted to the function block provided by each of the plurality of control apparatus.

In the plant control system, the control apparatus is a safety control apparatus for performing a stop operation of a plant with respect to an abnormal signal from the plant.

Effect of the Invention (1) A safety control apparatus has permission information for controlling a change in a security level. Therefore, it is possible to guard against a malignant change in the security level. Even if a password for changing the security level leaks, a database or a program of the safety control apparatus cannot be rewritten.

(2) By using a function block capable of controlling a change permission state, the need for a dedicated switch is eliminated in the CPU module itself and a general contact input signal can be used. Consequently, maintenance at a switch failure is facilitated and also a remote operation from the safety control apparatus is facilitated.

(3) Since a change permission state can be operated by a function block, setting of a permission condition is arbitrarily customized by a user and a severer release condition can be set easily. For example, an application, in which a password change is accepted when all the inputs of plural keys are turned on, can be created easily.

DESCRIPTION OF REFERENCE NUMERALS AND SIGNS

1 PLANT
2 CONTROL APPARATUS
3 CONTROL BUS
4 OPERATION MONITORING APPARATUS
5 GLOBAL COMMUNICATION BUS
6 EXTERNAL PC
10 ENGINEERING APPARATUS
100 SAFETY CONTROL APPARATUS
101 COMMUNICATION INTERFACE PART
102 SECURITY MANAGEMENT PART
103 REQUEST ACCEPTANCE TASK
104 Security Level Holding Part
105 PASSWORD HOLDING PART
106 REQUEST PROCESSING TASK
107 PROGRAM
108 DATABASE
109 CHANGE PERMISSION PART
110 USER APPLICATION
111 FUNCTION BLOCK

BEST MODE FOR CARRYING OUT THE INVENTION

Figure 1:
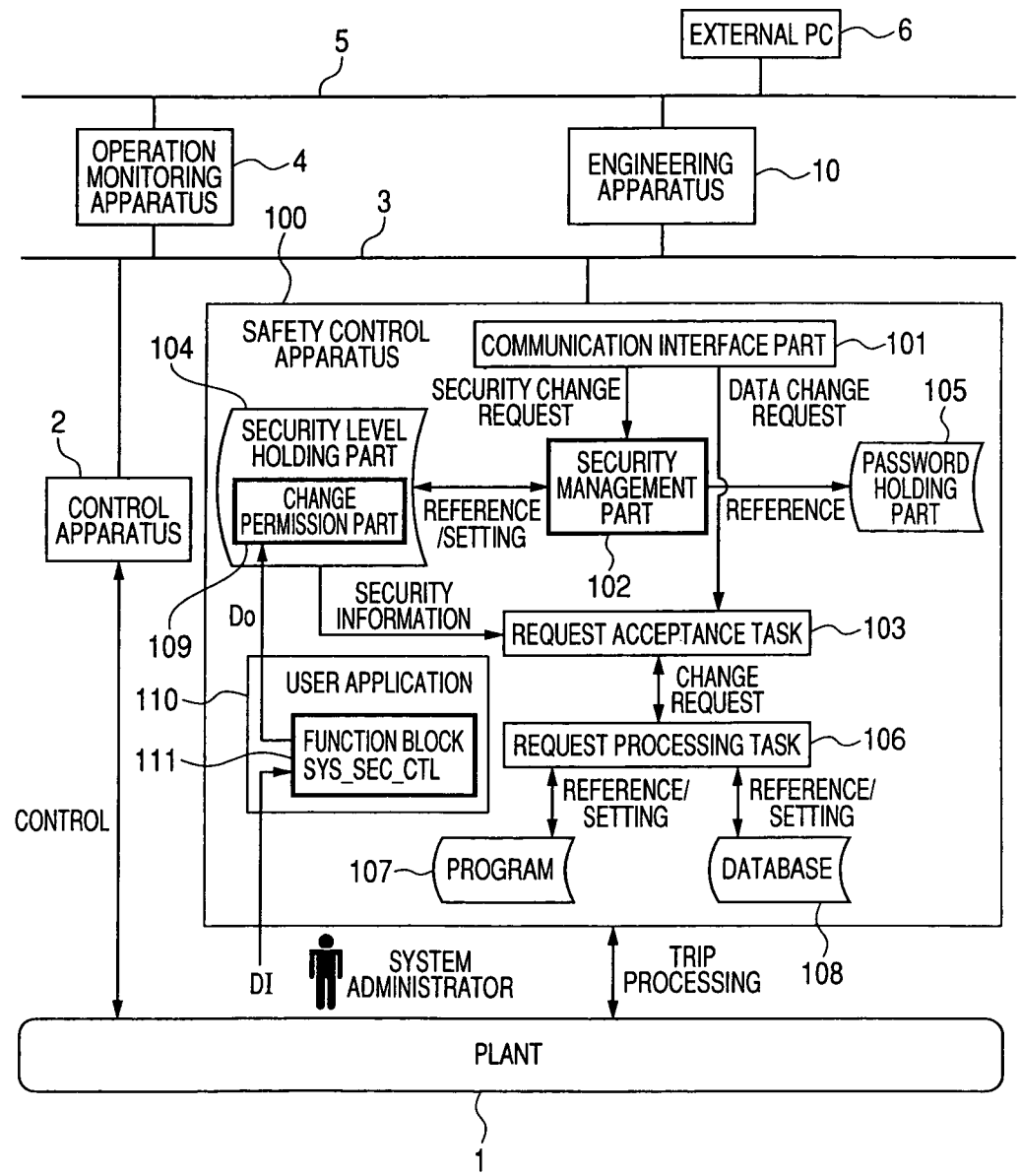
FIG. 1 is a functional block diagram showing an embodiment of a plant control system to which the present invention is applied in combination with a distributed control apparatus.
Figure 5:
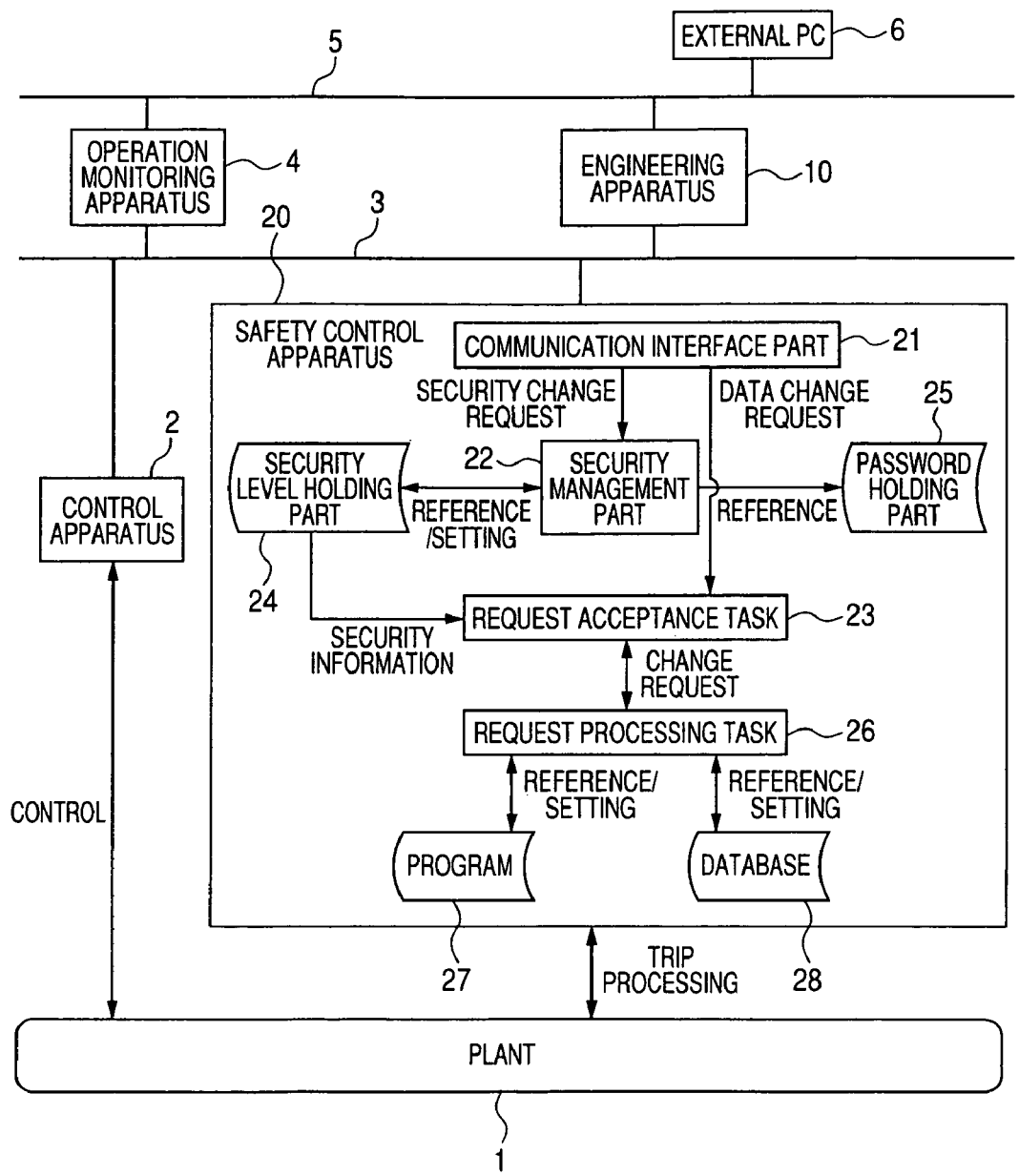
FIG. 5 is a functional block diagram showing one example of a plant control system in combination with a distributed control apparatus.

The present invention will hereinafter be described in detail by the drawings. FIG. 1 is a functional block diagram showing an embodiment of a plant control system to which the present invention is applied in combination with a distributed control apparatus. The description is omitted by assigning the same numerals to the same elements as those of the system described in FIG. 5.

In FIG. 1, Reference numeral 100 is a safety control apparatus. Each of the elements of a communication interface part 101, a request acceptance task 103, a password holding part 105, a request processing task 106, a program 107 and a database 108 is the same as each of the elements corresponding to the system described in FIG. 5.

Reference numeral 109 is a change permission part provided in a security level holding part 104. This change permission part 109 has flag information for determining whether or not a security level can be changed with respect to a change request from an engineering apparatus 10.

A flag of the change permission part 109 is operated by an output from a user application 110 for inputting a change permission signal given from the outside. Reference numeral 111 is a function block (SYS_SEC_CTL) defined inside the user application 110.

This function block 111 operates a flag of the change permission part 109 by inputting a permission signal DI operated by a system administrator and outputting an operation signal Do. The function block 111 changes a state of the change permission part 109 to "non-permission" when the input value DI is TRUE, and changes the state "permission" when the input value DI is FALSE.

A security management part 102 accepts a change request of a security level and makes a change in the security level, and refers to a change permission state of the change permission part 109 before referring to a password.

An error is returned to the engineering apparatus 10 with respect to the security level change request when the change permission state of the change permission part 109 is "non-permission", and collation processing of the password is performed when the change permission state of the change permission part 109 is "permission".

Figure 2:
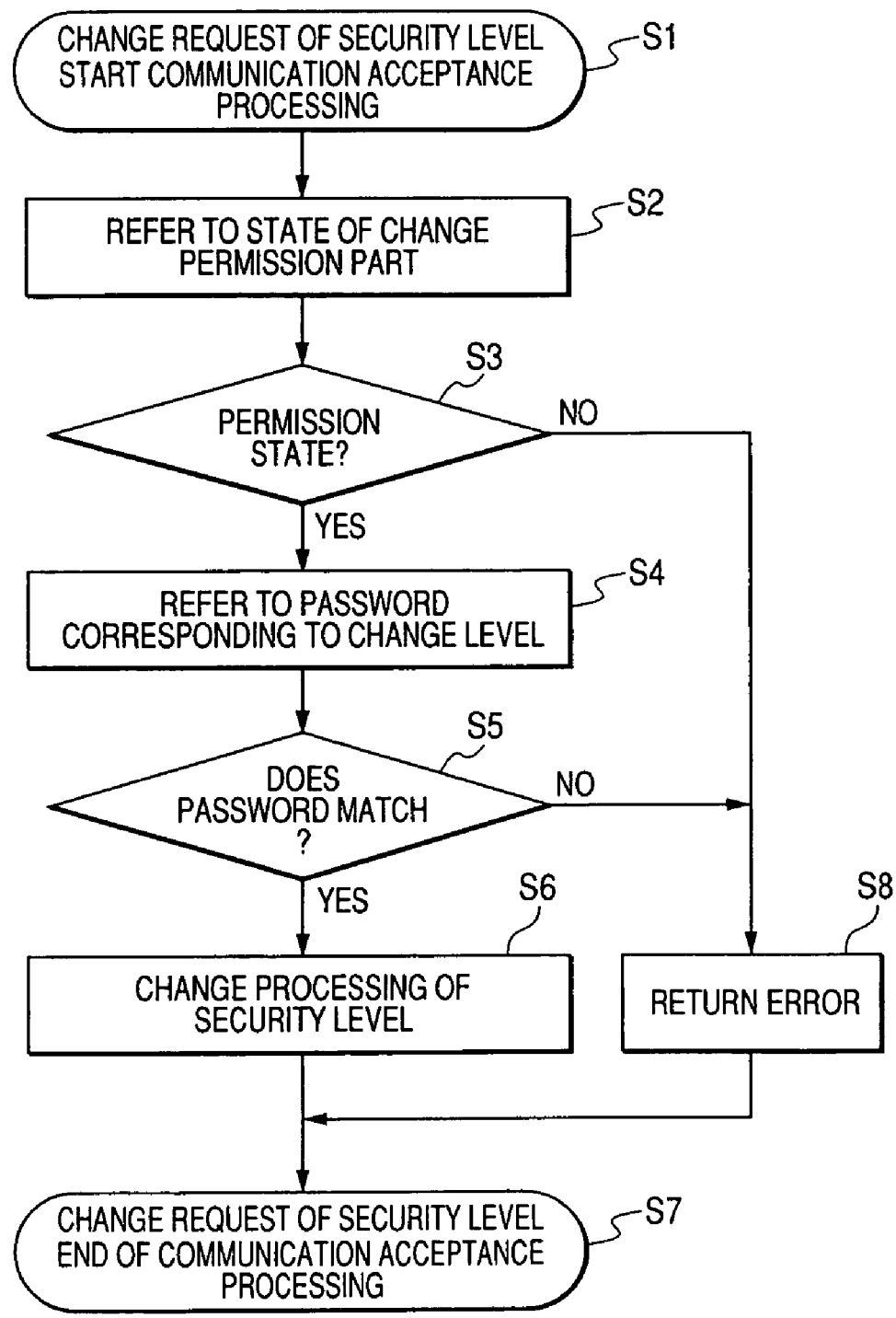
FIG. 2 is a flowchart showing a procedure of signal processing by a security management part.

FIG. 2 is a flowchart showing a procedure of signal processing by the security management part 102. Acceptance processing of change request communication is started in step S1, and then a change permission state of the change permission part 109 is referred to in step S2.

It is checked that the change permission state is a permission state in decision step S3. A password corresponding to a change level which is a security level at which a change request was made is referred to in step S4. In the case of checking a match of the password in decision step S5, change processing of the security level is performed in step S6 and the acceptance processing of change request communication is ended in step S7.

When the change permission state of the change permission part 109 is a non-permission state in decision step S3 and the password does not match in decision step S5, an error is returned to the engineering apparatus 10 in step S8 and the acceptance processing of change request communication is ended in step S7.

Figure 3:
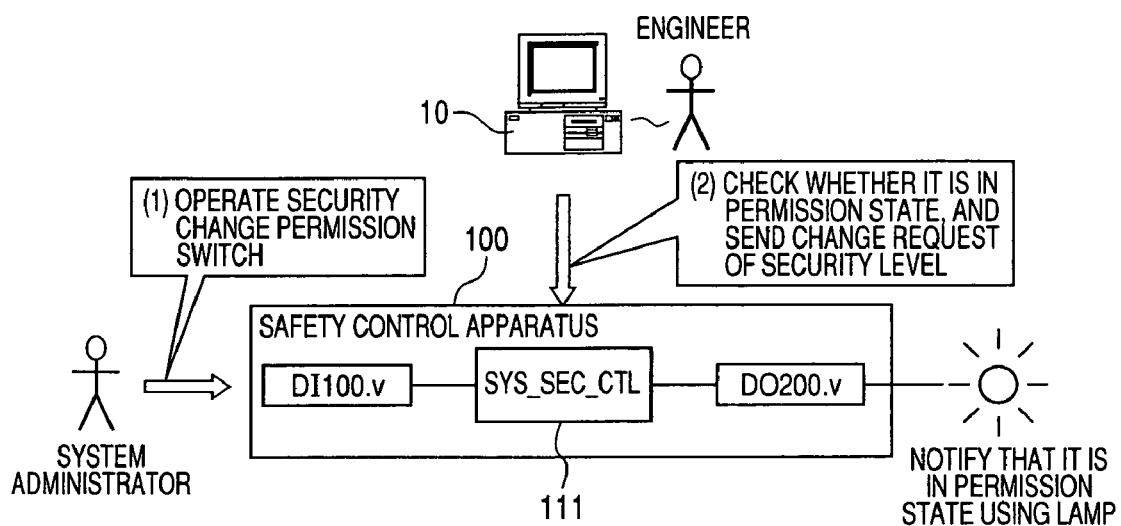
FIG. 3 is an image diagram describing a change procedure by a function block.

FIG. 3 is an image diagram describing a change procedure by the function block 111 (SYS_SEC_CTL). DI100.v is an input-output parameter connected to a digital input signal and a system administrator can change a value by turning on and off a key switch.

An engineer changes a security level from the engineering apparatus 10 using a password after checking a permission state of a security level change by a lamp working by a signal outputted from the function block 111 through an input-output parameter DO200.v.

In the present invention, by setting management of a change permission state in the function block, an input condition can arbitrarily be determined and further, the input signal itself can be converted into a signal from an external device. That is, an input to the SYS_SEC_CTL block can be inputted as, for example, communication data from other device through a communication part rather than an input signal.

Figure 4:
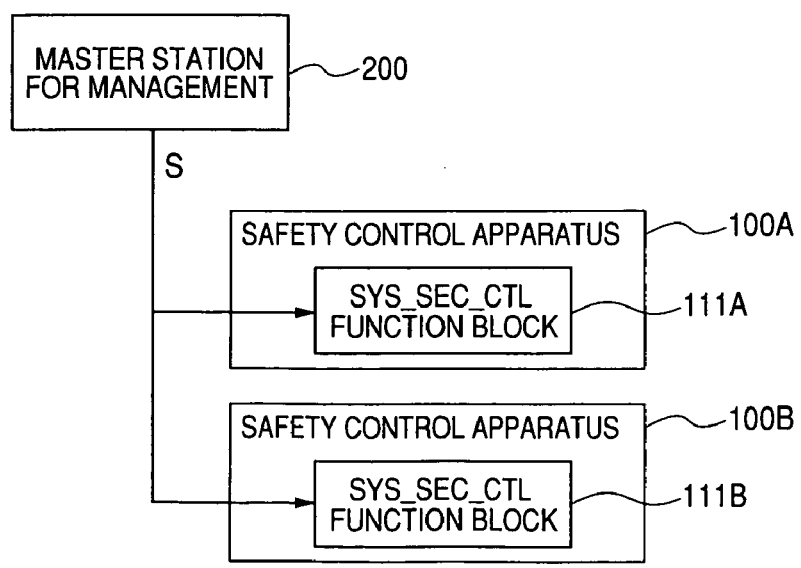
FIG. 4 is a functional block diagram of a main part showing another embodiment of the present invention.

FIG. 4 is a functional block diagram of a main part showing another embodiment of the present invention. By sharing inputs of function blocks 111A and 111B provided by safety control apparatus 100A and 100B in two plant control systems and by inputting a communication signal S between stations from a master station 200 for management, a change permission state of each of the systems can be managed collectively.

Also, change permission states of control apparatus in plural plants can be remotely operated from a host computer via OPC (OLE for Process Control) communication.

In the embodiments described above, the safety control apparatus 100 has been used as a target to which the invention is applied, but it can also be applied to change request processing from the engineering apparatus (not shown) to the control apparatus 2 in a distributed control apparatus.

The present application is based on Japanese patent application No. 2005-339836 filed on Nov. 25, 2005, the contents of which are hereby incorporated by reference.

The invention claimed is:

1. A plant control system comprising:
    at least one control apparatus; and
    an engineering apparatus for changing a security state of the control apparatus, wherein the control apparatus comprises:
        a security management part for accepting a security level change request downloaded from the engineering apparatus; and
        a change permission part for permitting the security management part to change a security level of the control apparatus,
    wherein the security management part checks with the change permission part for a change permission state before referring to a password corresponding to the security level change request in order to change the security level, said password is held in the control apparatus;
    wherein the control apparatus further comprises a user application to which a permission signal given from the outside of the control apparatus is inputted, and
    the change permission part is operated by an output from the user application.

2. The plant control system of claim 1, wherein the user application comprises a function block to which the permission signal is inputted and which outputs a signal for operating the change permission part.

3. The plant control system of claim 2, wherein the permission signal is inputted to the function block by a switch part operated by a system administrator.

4. The plant control system of claim 2, wherein the permission signal given from an external device through communication is inputted to the function block.

5. The plant control system of claim 2, wherein the permission signal given from an external device through communication is inputted to the function block provided by each of the plurality of control apparatus.

6. The plant control system of claim 1, wherein the control apparatus is a safety control apparatus for performing a stop operation of a plant with respect to an abnormal signal from the plant.

* * * * *